(12) United States Patent
Yabe et al.

(10) Patent No.: US 11,688,058 B2
(45) Date of Patent: Jun. 27, 2023

(54) PATTERN INSPECTION APPARATUS AND PATTERN INSPECTION METHOD

(71) Applicant: NuFlare Technology, Inc., Yokohama (JP)

(72) Inventors: Makoto Yabe, Yokohama (JP); Takafumi Inoue, Chigasaki (JP)

(73) Assignee: NuFlare Technology, Inc., Yokohama (JP)

( * ) Notice: Subject to any disclaimer, the term of this patent is extended or adjusted under 35 U.S.C. 154(b) by 242 days.

(21) Appl. No.: 17/233,730

(22) Filed: Apr. 19, 2021

(65) Prior Publication Data

US 2021/0407061 A1 Dec. 30, 2021

(30) Foreign Application Priority Data

Jun. 26, 2020 (JP) .............................. JP2020-110303

(51) Int. Cl.
 *G06T 7/00* (2017.01)
(52) U.S. Cl.
 CPC ............ *G06T 7/001* (2013.01); *G06T 7/0006* (2013.01); *G06T 2207/30148* (2013.01)
(58) Field of Classification Search
 CPC ....... A61B 5/441; A61B 5/4836; A61B 5/489; A61B 5/0075; A61B 5/0071; G06T 7/0014; G06T 7/001; G06T 7/0006; G06T 7/11; G06K 9/66; G06K 9/6232; G06K 9/6268; G02B 21/0048; G02B 21/0076
 See application file for complete search history.

(56) References Cited

U.S. PATENT DOCUMENTS

2019/0370972 A1* 12/2019 Bagci ..................... G06N 20/10
2021/0256701 A1* 8/2021 Nozaki ................. G06T 7/0016

FOREIGN PATENT DOCUMENTS

JP 2011-129624 A 6/2011

* cited by examiner

*Primary Examiner* — Phuoc H Doan
(74) *Attorney, Agent, or Firm* — Oblon, McClelland, Maier & Neustadt, L.L.P.

(57) ABSTRACT

A pattern inspection apparatus includes an optical image acquisition mechanism to acquire an optical image of each of a plurality of regions on the inspection substrate where a pattern is formed, a plurality of comparison circuits to individually compare the optical image with a reference image corresponding to the optical image, an abnormality determination circuit to determine, based on comparison results, whether there is a region having an inspection abnormality in the plurality of regions, a malfunction diagnosis circuit to diagnose whether a comparison circuit that performed comparison for the region determined to have the inspection abnormality in the plurality of regions has a malfunction, and an assignment processing circuit to individually assign regions of the plurality of regions where comparison is to be performed to comparison circuits that are not diagnosed as malfunctions, and to exclude a comparison circuit diagnosed as a malfunction from the region assignment target.

11 Claims, 14 Drawing Sheets

| Comparison Circuit 10 | Stripe 10 |
|---|---|
| Comparison Circuit 9 | Stripe 9 |
| Comparison Circuit 8 | Stripe 8 |
| Comparison Circuit 7 | Stripe 7 |
| Comparison Circuit 6 | Stripe 6 |
| Comparison Circuit 5 | Stripe 5 |
| Comparison Circuit 4 | Stripe 4 |
| Comparison Circuit 3 | Stripe 3 |
| Comparison Circuit 2 | Stripe 2 |
| Comparison Circuit 1 | Stripe 1 |

| | |
|---|---|
| Comparison Circuit 10 | Stripe 10 |
| Comparison Circuit 9 | Stripe 9 |
| Comparison Circuit 8 | Stripe 8 |
| Comparison Circuit 7 | Stripe 7 |
| Comparison Circuit 6 | Stripe 6 |
| Comparison Circuit 5 | Stripe 5 |
| Comparison Circuit 4 | Stripe 4 |
| Comparison Circuit 3 | Stripe 3 |
| Comparison Circuit 2 | Stripe 2 |
| Comparison Circuit 1 | Stripe 1 | Inspection Abnormality

| | |
|---|---|
| Comparison Circuit 10 | Stripe 1 |
| Comparison Circuit 9 | Stripe 1 |
| Comparison Circuit 8 | Stripe 1 |
| Comparison Circuit 7 | Stripe 1 |
| Comparison Circuit 6 | Stripe 1 |
| Comparison Circuit 5 | Stripe 1 |
| Comparison Circuit 4 | Stripe 1 |
| Comparison Circuit 3 | Stripe 1 |
| Comparison Circuit 2 | Stripe 1 |
| Comparison Circuit 1 | Stripe 1 | Candidate for Malfunction

| | |
|---|---|
| Comparison Circuit 10 | Stripe 9 |
| Comparison Circuit 9 | Stripe 8 |
| Comparison Circuit 8 | Stripe 7 |
| Comparison Circuit 7 | Stripe 6 |
| Comparison Circuit 6 | Stripe 5 |
| Comparison Circuit 5 | Stripe 4 |
| Comparison Circuit 4 | Stripe 3 |
| Comparison Circuit 3 | Stripe 2 |
| Comparison Circuit 2 | Stripe 1 |
| Comparison Circuit 1 | - | Unusable (Closed) due to Malfunction |

| Comparison Circuit 10 | Stripe 10 |
| --- | --- |
| Comparison Circuit 9 | Stripe 9 |
| Comparison Circuit 8 | Stripe 8 |
| Comparison Circuit 7 | Stripe 7 |
| Comparison Circuit 6 | Stripe 6 |
| Comparison Circuit 5 | Stripe 5 |
| Comparison Circuit 4 | Stripe 4 |
| Comparison Circuit 3 | Stripe 3 |
| Comparison Circuit 2 | Stripe 2 |
| Comparison Circuit 1 | Stripe 1 | Inspection Abnormality

FIG.11B

| Comparison Circuit 10 | Stripe 1 |
| --- | --- |
| Comparison Circuit 9 | Stripe 10 |
| Comparison Circuit 8 | Stripe 9 |
| Comparison Circuit 7 | Stripe 8 |
| Comparison Circuit 6 | Stripe 7 |
| Comparison Circuit 5 | Stripe 6 |
| Comparison Circuit 4 | Stripe 5 |
| Comparison Circuit 3 | Stripe 4 |
| Comparison Circuit 2 | Stripe 3 |
| Comparison Circuit 1 | Stripe 2 | Candidate for Malfunction

FIG.13A

| | k-th Stripe | |
|---|---|---|
| Sub Comparison Circuit 10 | Frame 10 | |
| Sub Comparison Circuit 9 | Frame 9 | |
| Sub Comparison Circuit 8 | Frame 8 | |
| Sub Comparison Circuit 7 | Frame 7 | |
| Sub Comparison Circuit 6 | Frame 6 | |
| Sub Comparison Circuit 5 | Frame 5 | |
| Sub Comparison Circuit 4 | Frame 4 | |
| Sub Comparison Circuit 3 | Frame 3 | |
| Sub Comparison Circuit 2 | Frame 2 | |
| Sub Comparison Circuit 1 | Frame 1 | Inspection Abnormality |

FIG.13B

| | k-th Stripe | |
|---|---|---|
| Sub Comparison Circuit 10 | Frame 1 | |
| Sub Comparison Circuit 9 | Frame 1 | |
| Sub Comparison Circuit 8 | Frame 1 | |
| Sub Comparison Circuit 7 | Frame 1 | |
| Sub Comparison Circuit 6 | Frame 1 | |
| Sub Comparison Circuit 5 | Frame 1 | |
| Sub Comparison Circuit 4 | Frame 1 | |
| Sub Comparison Circuit 3 | Frame 1 | |
| Sub Comparison Circuit 2 | Frame 1 | |
| Sub Comparison Circuit 1 | Frame 1 | Candidate for Malfunction |

| | k-th Stripe |
|---|---|
| Sub Comparison Circuit 10 | Frame 9 |
| Sub Comparison Circuit 9 | Frame 8 |
| Sub Comparison Circuit 8 | Frame 7 |
| Sub Comparison Circuit 7 | Frame 6 |
| Sub Comparison Circuit 6 | Frame 5 |
| Sub Comparison Circuit 5 | Frame 4 |
| Sub Comparison Circuit 4 | Frame 3 |
| Sub Comparison Circuit 3 | Frame 2 |
| Sub Comparison Circuit 2 | Frame 1 |
| Sub Comparison Circuit 1 | - → Unusable (Closed) due to Malfunction |

FIG.14

PATTERN INSPECTION APPARATUS AND PATTERN INSPECTION METHOD

CROSS-REFERENCE TO RELATED APPLICATION

This application is based upon and claims the benefit of priority from prior Japanese Patent Application No. 2020-110303 filed on Jun. 26, 2020 in Japan, the entire contents of which are incorporated herein by reference.

BACKGROUND OF THE INVENTION

Field of the Invention

Embodiments of the present invention relate to a pattern inspection apparatus and a pattern inspection method. For example, they relate to an apparatus and method for inspecting a defect of a pattern on an exposure mask used in manufacturing semiconductor devices.

Description of Related Art

With recent progress in high integration and large capacity of the LSI (Large Scale Integrated circuits), the line width (critical dimension) required for circuits of semiconductor elements is becoming increasingly narrower. Such semiconductor elements are manufactured through circuit-forming by exposing and transferring a pattern onto a wafer by means of a reduced projection exposure apparatus known as a stepper, using an original or "master" pattern (also called a mask or a reticle, hereinafter generically referred to as a mask) on which a circuit pattern has been formed.

Since LSI manufacturing requires an enormous production cost, it is essential to improve the yield. One of major factors that decrease the yield of the LSI manufacturing is due to pattern defects on a mask for exposing/transferring an ultrafine pattern onto a semiconductor wafer by the photolithography technology. In recent years, with miniaturization of dimensions of LSI patterns formed on a semiconductor wafer, dimensions to be detected as a pattern defect have become extremely small. Therefore, the pattern inspection apparatus for inspecting defects of a transfer mask used in manufacturing LSI needs to be highly accurate.

As an inspection method, for example, there is "die-to-die inspection" or "die-to-database inspection". The "die-to-die inspection" method compares data of optical images of identical patterns at different positions on the same mask. The "die-to-database inspection" method inputs, into an inspection apparatus, writing data (design data) generated by converting pattern-designed CAD data to a writing apparatus specific format to be input to the writing apparatus when a pattern is written on the mask, generates a reference image based on the input writing data, and compares the generated reference image with an optical image being measured target data obtained by imaging the pattern.

The time for inspection can be reduced by performing in parallel the comparison processing described above, using a plurality of processing circuits.

As a result of inspection, if it turns out that defects have occurred frequently, the cause may be a case where the inspection mask itself has a problem, or a case where the inspection apparatus has a malfunction (out of order). For example, when defects occur frequently in a holiday or at night, the maker of the apparatus needs to take urgent measures in order to avoid a long downtime of the inspection apparatus. Accordingly, in the case of such frequent defects, a method is required that diagnoses the cause by the inspection apparatus itself, and avoids a long downtime even if the apparatus itself has a malfunction.

Although not with respect to diagnosis of malfunction (failure) of an inspection apparatus, there is disclosed a method of performing writing to the substrate under three conditions: normal conditions, safe conditions, and accelerated conditions, and of deducing that, if there is a difference between the number of defects in a region written under the safe conditions and the number of defects in a region written under the accelerated conditions, the defects are caused by the electron beam writing apparatus (e.g., refer to Japanese Patent Application Laid-open (JP-A) No. 2011-129624). However, this method is based on a premise that the inspection apparatus is working in a normal state, and therefore, it is difficult to take measures against a malfunction of the inspection apparatus itself.

BRIEF SUMMARY OF THE INVENTION

According to one aspect of the present invention, a pattern inspection apparatus includes an optical image acquisition mechanism configured to acquire an optical image of each of a plurality of regions on a substrate to be inspected on which a pattern is formed, a plurality of comparison circuits configured to individually perform comparison processing of comparing the optical image with a reference image corresponding to the optical image, an abnormality determination circuit configured to determine, based on comparison results generated in the plurality of comparison circuits, whether there is a region having an inspection abnormality in the plurality of regions, a malfunction diagnosis circuit configured to diagnose whether a comparison circuit that performed comparison processing for the region determined to have the inspection abnormality in the plurality of regions has a malfunction, and an assignment processing circuit configured to individually assign regions of the plurality of regions where comparison processing is to be performed to comparison circuits that are not diagnosed as malfunctions in the plurality of comparison circuits, and to exclude a comparison circuit diagnosed as a malfunction from a target to which a region is assigned.

According to another aspect of the present invention, a pattern inspection method includes acquiring an optical image of each of a plurality of regions on a substrate to be inspected on which a pattern is formed; performing comparison processing of comparing the optical image with a reference image corresponding to the optical image using each of a plurality of comparison circuits, and outputting each of comparison results; determining, based on the comparison results generated in the plurality of comparison circuits, whether there is a region having an inspection abnormality in the plurality of regions; diagnosing whether a comparison circuit that performed comparison processing for the region determined to have the inspection abnormality in the plurality of regions has a malfunction; and excluding a comparison circuit diagnosed as a malfunction in the plurality of comparison circuits from a target to which a region is assigned, and assigning regions where comparison processing has not yet been performed in the plurality of regions to comparison circuits that are not diagnosed as malfunctions.

According to yet another aspect of the present invention, a pattern inspection apparatus includes an optical image acquisition mechanism configured to acquire an optical image of each of a plurality of regions on a substrate to be inspected on which a pattern is formed, a plurality of comparison circuits each of which configured to include a plurality of sub comparison circuits that individually perform comparison processing of comparing the optical image with a reference image corresponding to the optical image, an abnormality determination circuit configured to determine, based on comparison results generated in the plurality of sub comparison circuits, whether there is a region having an inspection abnormality in the plurality of regions, a malfunction diagnosis circuit configured to diagnose whether a sub comparison circuit that performed comparison processing for the region determined to have the inspection abnormality in the plurality of regions has a malfunction, and an assignment processing circuit configured to individually assign regions of the plurality of regions, where comparison processing is to be performed, to sub comparison circuits that are not diagnosed as malfunctions in the plurality of sub comparison circuits including a sub comparison circuit diagnosed as a malfunction, and to exclude the sub comparison circuit diagnosed as the malfunction from a target to which a region is assigned.

BRIEF DESCRIPTION OF THE DRAWINGS

FIG. 6 shows an example of region assignment according to the first embodiment;

FIGS. 9A and 9B illustrate a method for diagnosing a malfunction according to the first embodiment;

FIG. 10 shows an example of assignment processing after diagnosis for malfunction according to the first embodiment;

FIGS. 11A and 11B illustrate a method for diagnosing a malfunction according to a second embodiment;

FIGS. 13A and 13B illustrate a method for diagnosing a malfunction according to a modified example of each Embodiment; and FIG. 14 shows an example of assignment processing after diagnosis for malfunction according to a modified example of each Embodiment.

DETAILED DESCRIPTION OF THE INVENTION

Embodiments below describe an inspection apparatus and method capable of avoiding, when defects occur frequently, a long down time even in the case where the inspection apparatus is out of order.

First Embodiment

Figure 1:
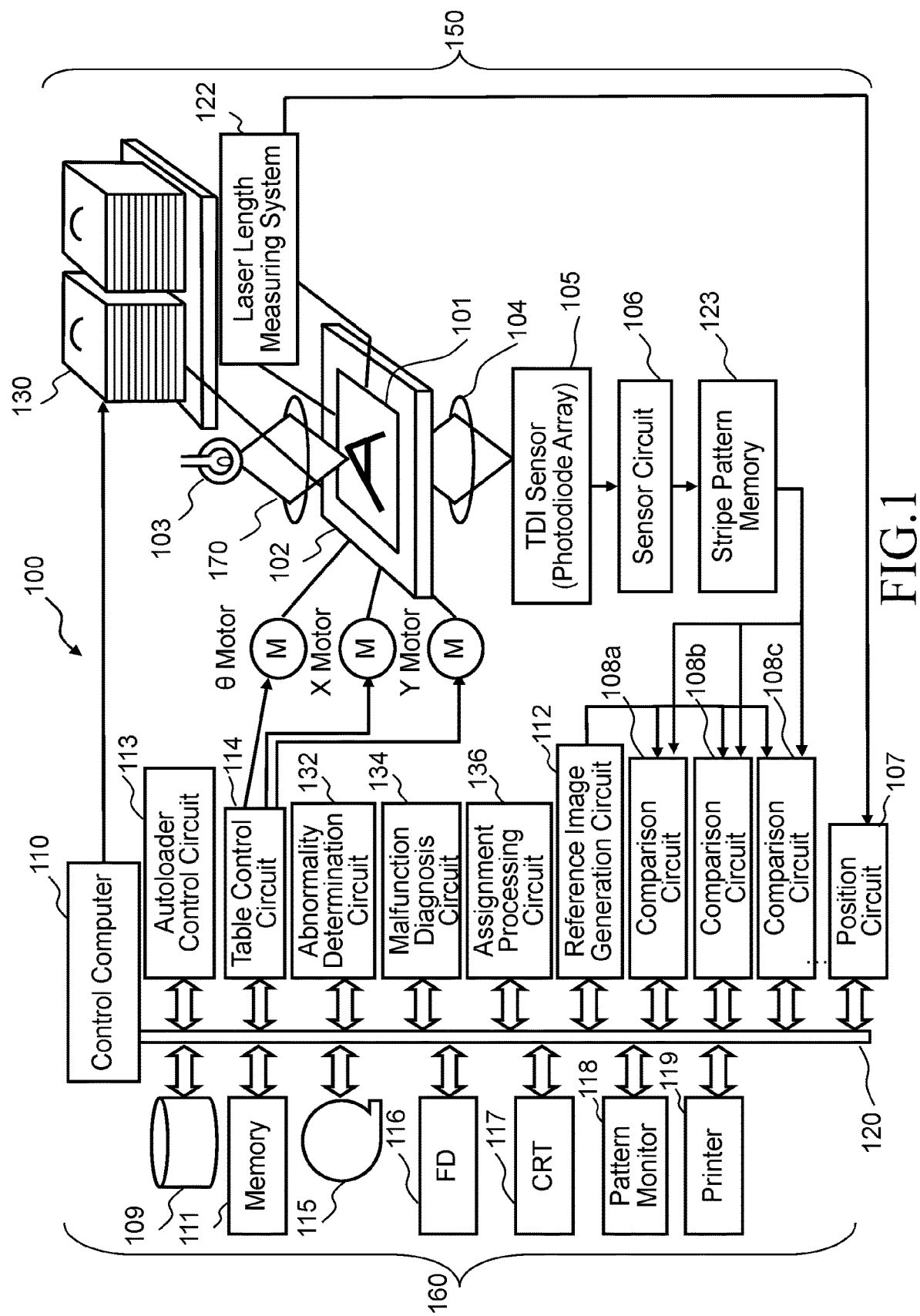
FIG. 1 illustrates a configuration of a pattern inspection apparatus according to a first embodiment.

FIG. 1 illustrates a configuration of a pattern inspection apparatus according to a first embodiment. As shown in FIG. 1, an inspection apparatus 100 that inspects defects of a pattern formed on an inspection target substrate, such as a mask, includes an optical image acquisition mechanism 150 and a control system circuit 160.

The optical image acquisition mechanism 150 includes a light source 103, an illumination optical system 170, an XYθ table 102 movably arranged, a magnifying optical system 104, a TDI (time delay integration) sensor 105, a sensor circuit 106, a stripe pattern memory 123, a laser length measuring system 122, and an autoloader 130. A substrate 101 conveyed from the autoloader 130 is placed on the XYθ table 102. The substrate 101 is, for example, an exposure photomask used for transfer printing a pattern onto a semiconductor substrate such as a wafer. A plurality of figure patterns to be inspected are formed on the photomask. The substrate 101 is disposed, for example, with its pattern-forming surface facing downward, on the XYθ table 102.

In the control system circuit 160, a control computer 110 which controls the whole of the inspection apparatus 100 is connected, through a bus 120, to a position circuit 107, a plurality of comparison circuits 108 (108a, 108b, 108c, and so on), a reference image generation circuit 112, an autoloader control circuit 113, a table control circuit 114, an inspection abnormality determination circuit 132, a malfunction diagnosis circuit 134, an assignment processing circuit 136, a magnetic disk drive 109, a memory 111, a magnetic tape drive 115, a flexible disk drive (FD) 116, a CRT 117, a pattern monitor 118, and a printer 119. The sensor circuit 106 is connected to the stripe pattern memory 123 which is connected to the plurality of comparison circuits 108. The XYθ table 102 is driven by the x, y, and θ-axis motors, and serves as an example of the stage. The reference image generation circuit 112 is connected to the plurality of comparison circuits 108. As the bus 120, a 10 Gbit Ethernet cable is used, for example.

Each " . . . circuit", such as the position circuit 107, the plurality of comparison circuits 108 (108a, 108b, 108c, and so on), the reference image generation circuit 112, the autoloader control circuit 113, the table control circuit 114, the inspection abnormality determination circuit 132, the malfunction diagnosis circuit 134, and the assignment processing circuit 136 includes processing circuitry. As the processing circuitry, for example, an electric circuit, computer, processor, circuit board, quantum circuit, semiconductor device, or the like can be used. Each " . . . circuit" may use common processing circuitry (the same processing circuitry), or different processing circuitry (separate processing circuitry). For example, each " . . . circuit", such as the position circuit 107, the plurality of comparison circuits 108, the reference image generation circuit 112, the autoloader control circuit 113, the table control circuit 114, the inspection abnormality determination circuit 132, the malfunction diagnosis circuit 134, and the assignment processing circuit 136 may be configured and executed by the control computer 110. Input data necessary for the position circuit 107, the plurality of comparison circuits 108, the reference image generation circuit 112, the autoloader control circuit 113, the table control circuit 114, the inspection abnormality determination circuit 132, the malfunction diagnosis circuit 134, and the assignment processing circuit 136, and operated (calculated) results are stored in a memory (not shown) or the memory 111 each time. A program for causing a computer to execute processing or the like may be stored in a recording medium, such as the magnetic disk drive 109, magnetic tape drive 115, FD 116, ROM (Read Only Memory), or the like.

In the inspection apparatus 100, an inspection optical system of large magnification is composed of the light source 103, the XYθ table 102, the illumination optical system 170, the magnifying optical system 104, the TDI sensor 105, and the sensor circuit 106. The XYθ table 102 is driven by the table control circuit 114 under the control of the control computer 110. The XYθ table 102 can be moved by a drive system such as a three-axis (X, Y, and θ) motor which drives the table in the directions of x, y, and θ. For example, a step motor can be used as each of these X, Y, and θ motors. The XYθ table 102 is movable in the horizontal direction and the rotation direction by the X-, Y-, and θ-axis motors. The movement position of the substrate 101 placed on the XYθ table 102 is measured by the laser length measuring system 122, and supplied to the position circuit 107. The transfer (feed) processing of the substrate 101 from the autoloader 130 to the XYθ table 102, and from the XYθ table 102 to the autoloader 130 is controlled by the autoloader control circuit 113.

Writing data (design data) used as a basis for forming patterns on the inspection substrate 101 is input from the outside of the inspection apparatus 100, and stored in the magnetic disk drive 109. The writing data defines a plurality of figure patterns, and each figure pattern is usually configured by combining a plurality of element figures. Such a figure pattern may be configured by one figure. Then, each pattern corresponding to and based on each figure pattern defined by the writing data is formed on the inspection substrate 101.

FIG. 1 shows configuration elements necessary for describing the first embodiment. It should be understood that other configuration elements generally necessary for the inspection apparatus 100 may also be included therein.

Figure 2:
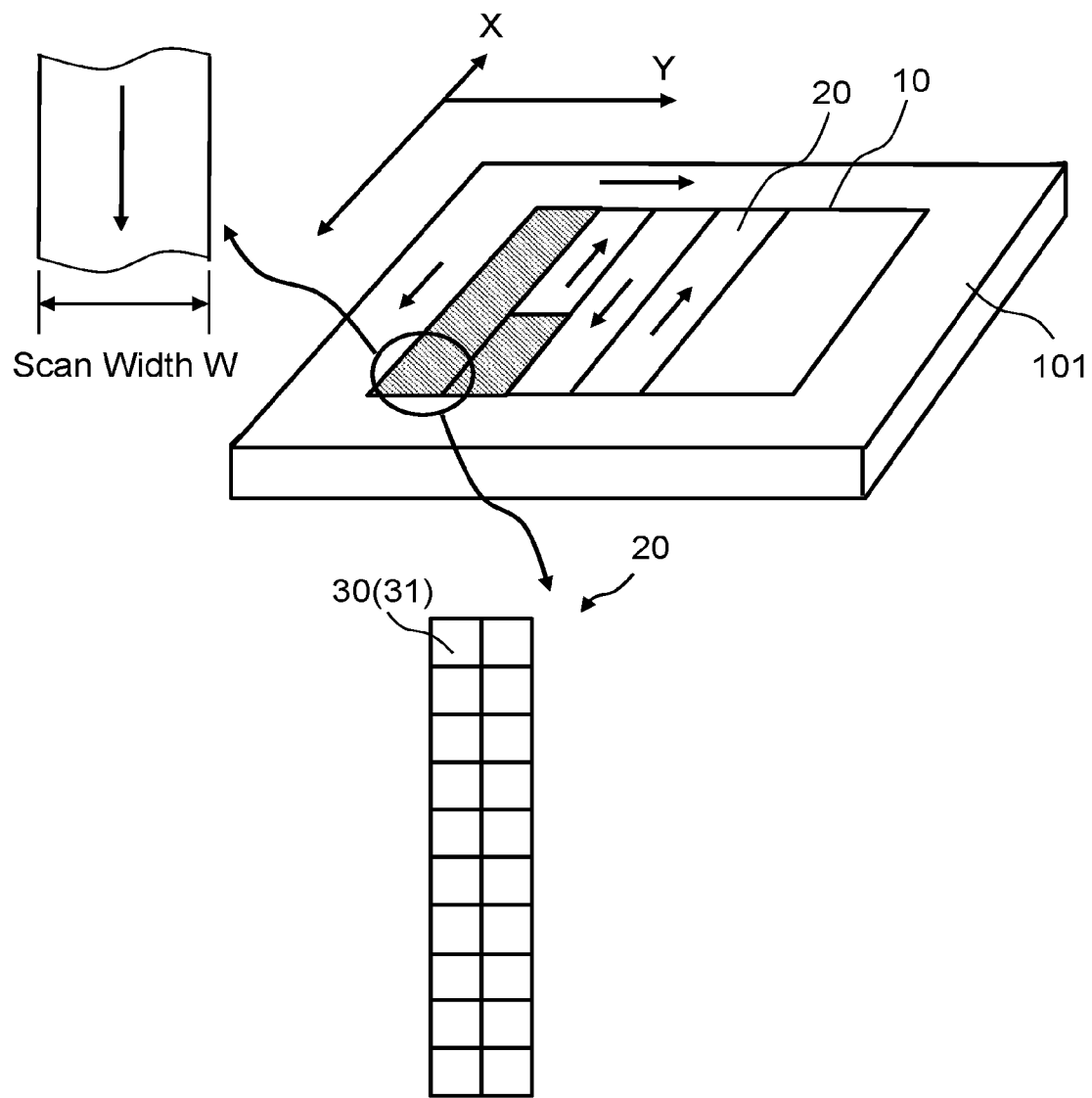
FIG. 2 is a conceptual diagram illustrating an inspection region according to the first embodiment.

FIG. 2 is a conceptual diagram illustrating an inspection region according to the first embodiment. As shown in FIG. 2, an inspection region 10 (the entire inspection region) of the substrate 101 is virtually divided into a plurality of strip-shaped inspection stripes 20 each having a width W in the y direction, for example, where the width W is a scan width of the TDI sensor 105. The inspection apparatus 100 acquires an image (stripe region image) for each inspection stripe 20. Specifically, with respect to each of the inspection stripes 20, the inspection apparatus 100 captures (acquires) an image of a figure pattern arranged in the stripe region concerned, with a laser light (inspection light), imaging in the longitudinal direction (the x direction) of the stripe region concerned. In order to prevent a missing image, it is preferable that a plurality of inspection stripes 20 are set such that adjacent inspection stripes 20 overlap with each other by a predetermined margin width.

The TDI sensor 105 that continuously moves relatively in the x direction by the movement of the XYθ table 120 acquires an optical image. The TDI sensor 105 continuously captures optical images each having the scan width W as shown in FIG. 2. In other words, while moving relatively in the integration direction of the TDI sensor 105, the TDI sensor 105 captures optical images of a plurality of figure patterns formed on the substrate 101. According to the first embodiment, after capturing (acquiring) an optical image in one inspection stripe 20, the TDI sensor 105 moves in the y direction to the position of the next inspection stripe 20, and similarly captures another optical image having the scan width W continuously while moving in the direction reverse to the last image capturing direction. Thereby, the image capturing is repeated in the forward(FWD) and backward (BWD) directions, namely changing the direction reversely when advancing and returning.

In an actual inspection, as shown in FIG. 2, the stripe region image of each inspection stripe 20 is divided into images of a plurality of rectangular (including square) frame regions 30. Then, inspection is performed for each image of the frame region 30. For example, it is divided into the size of 512×512 pixels. Therefore, a reference image to be compared with a frame image 31 of the frame region 30 is similarly generated for each frame region 30.

The direction of the image capturing is not limited to repeating the forward(FWD) and backward(BWD) movement. Images may be captured in a fixed one direction. For example, FWD and FWD may be repeated, or alternatively, BWD and BWD may be repeated.

Figure 3:
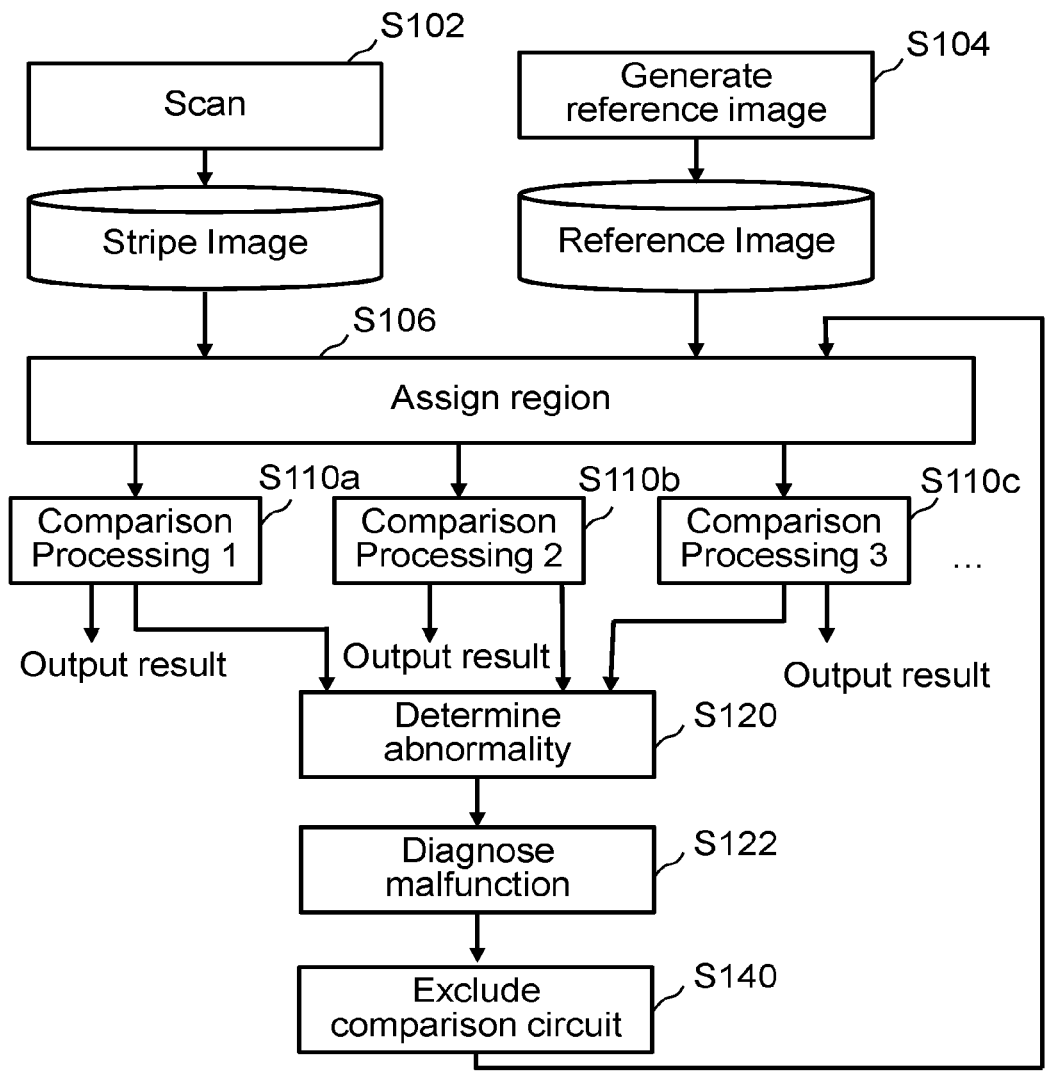
FIG. 3 is a flowchart showing main steps of an inspection method according to the first embodiment.

FIG. 3 is a flowchart showing main steps of an inspection method according to the first embodiment. In FIG. 3, the inspection method of the first embodiment executes a series of steps: a scanning step (S102), a reference image generating step (S104), a region assigning step (S106), a plurality of comparing steps (S110) implemented in parallel, an inspection abnormality determining step (S120), a malfunction diagnosing step (S122), and a comparison circuit excluding step (S140).

In the scanning step (S120), the optical image acquisition mechanism 150 acquires optical images of a plurality of regions on a substrate to be inspected on which a pattern is formed. Specifically, first, the optical image acquisition mechanism 150 scans the inspection stripe 20 with laser beams (inspection light) so as to acquire, for each inspection stripe 20, an image of the stripe region by the TDI sensor 105. Further detailed operations are as follows: The XYθ table 102 is moved to the position where a target inspection stripe 20 can be image-captured. A pattern formed on the substrate 101 is irradiated with a laser light (e.g., DUV light) serving as an inspection light, whose wavelength is equal to or shorter than that of a light in the ultraviolet region, from the appropriate light source 103 through the illumination optical system 170. A light having passed through the substrate 101 is focused, through the magnifying optical system 104, to form an image on the TDI sensor 105 (an example of a sensor) as an optical image to be input thereto.

A pattern image focused/formed on the TDI sensor 105 is photoelectrically converted by each photodiode of the TDI sensor 105, and further, analog-to-digital (A/D) converted by the sensor circuit 106. Then, pixel data for the inspection stripe 20 to be measured is stored in the stripe pattern memory 123. When capturing (acquiring) an image of the pixel data (stripe region image), for example, a dynamic range where the case of 60% of the illumination light amount being incident is the maximum gray level is used as the dynamic range of the TDI sensor 105. Measurement data (pixel data) is, for example, 8-bit unsigned data, and indicates a gray scale level (light intensity)/brightness of each pixel.

In the reference image generating step (S104), the reference image generation circuit 112 generates a reference image serving as reference, using figure pattern data (design data). Specifically, it operates as follows: the reference image generation circuit 112 inputs figure pattern data (design data) with respect to each frame region 30 of the target inspection stripe 20, and converts each figure pattern defined by the input figure pattern data into image data of binary or multiple values.

Basic figures defined by the figure pattern data are, for example, rectangles and triangles. For example, there is stored figure data defining the shape, size, position, and the like of each pattern figure by using information, such as coordinates (x, y) of the reference position of the figure, lengths of sides of the figure, and a figure code serving as an identifier for identifying the figure type such as rectangles, triangles and the like.

When design pattern data used as the figure data is input to the reference image generation circuit 112, the data is developed into data of each figure. Then, the figure code, the figure dimensions, and the like indicating the figure shape of each figure data are interpreted. Then, the reference image generation circuit 112 develops each figure data to design pattern image data of binary or multiple values as a pattern to be arranged in squares in units of grids of predetermined quantization dimensions, and outputs the developed data. In other words, the reference image generation circuit 112 reads design data, calculates the occupancy of a figure in the design pattern, for each square region obtained by virtually dividing the frame region into squares in units of predetermined dimensions, and outputs n-bit occupancy data (design image data). For example, it is preferable to set one square as one pixel. Assuming that one pixel has a resolution of $1/2^8 (=1/256)$, the occupancy in each pixel is calculated by allocating small regions which correspond to the region of figures arranged in the pixel concerned and each of which corresponds to $1/256$ resolution. Then, 8-bit occupancy data is generated. Such square regions (inspection pixels) can be corresponding to (matched with) pixels of measured data.

Next, the reference image generation circuit 112 performs appropriate filter processing, using a filter function, on design image data of a design pattern which is image data of a figure.

Figure 4:
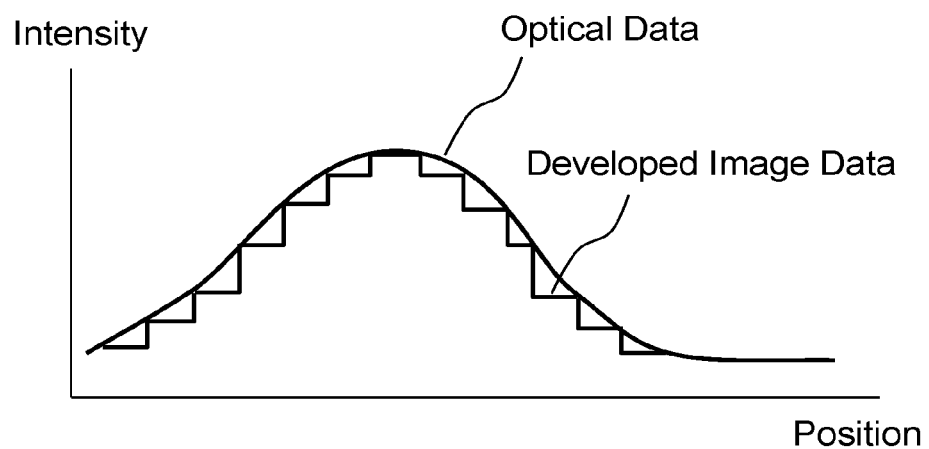
FIG. 4 illustrates filter processing according to the first embodiment.

FIG. 4 illustrates filter processing according to the first embodiment. Pixel data of the optical image acquired from the substrate 101 is in a state affected by filtering due to resolution characteristics etc. of the optical system used for image-capturing, in other words, in an analog state continuously changing. Therefore, for example, as shown in FIG. 4, the optical image is different from the developed image (design image) whose image intensity (gray scale value) is represented by digital values. On the other hand, in figure pattern data converted from contour data, since pattern codes, etc. are used for defining as described above, image intensity (gray scale level) of developed design images may be digital values. Accordingly, the reference image generation circuit 112 performs image processing (filter processing) on the developed image in order to generate a reference image close to the optical image. Thereby, it is possible to match design image data being image data on the design side, whose image intensity (gray scale level) is in digital values, with image generation characteristics of measured data (optical image).

Figure 5:
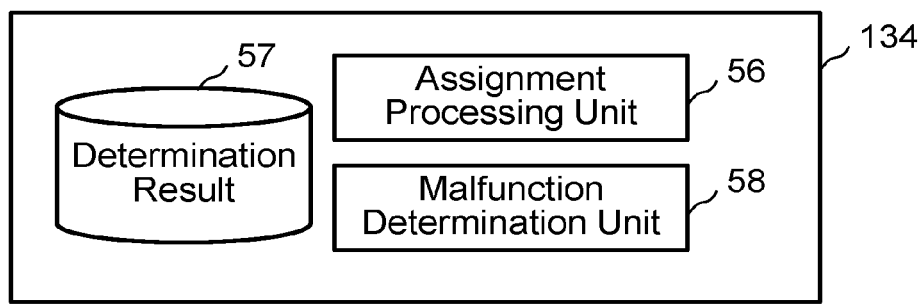
FIG. 5 shows an example of an internal configuration of an assignment processing circuit according to the first embodiment.

FIG. 5 shows an example of an internal configuration of an assignment processing circuit according to the first embodiment. As shown in FIG. 5, a storage device 57 such as a magnetic disk drive, an assignment processing unit 56, and a malfunction determination unit 58 are arranged in the assignment processing circuit 136. Each of the "units" such as the assignment processing unit 56 and the malfunction determination unit 58 includes processing circuitry. As the processing circuitry, for example, an electric circuit, computer, processor, circuit board, quantum circuit, semiconductor device, or the like can be used. Each of the "units" may use common processing circuitry (the same processing circuitry), or different processing circuitry (separate processing circuitry). Input data needed in the assignment processing unit 56 and the malfunction determination unit 58, and calculated results are stored in a memory (not shown) in the assignment processing circuit 136 or in the memory 118 each time.

In the region assigning step (S106), the assignment processing unit 56 assigns the inspection stripe 20 (region), where comparison processing is to be performed, to the comparison circuit 108 that is not diagnosed as a malfunction (failure) in a plurality of comparison circuits 108.

FIG. 6 shows an example of region assignment according to the first embodiment. FIG. 6 shows the case where ten comparison circuits 108 are installed in the inspection apparatus 100. In FIG. 6, for example, inspection stripes 20 are individually assigned to a corresponding comparison circuit 108. For example, the inspection stripe 1 is assigned to the comparison circuit 1. The inspection stripe 2 is assigned to the comparison circuit 2. The inspection stripe 3 is assigned to the comparison circuit 3. Subsequently, the inspection stripes 4 to 10 are similarly assigned to the comparison circuits 4 to 10 individually.

Under the control of the control computer 110, a stripe region image (stripe data) acquired in the scanning step is sequentially sent, with data indicating the position of the substrate 101 on the XYθ table 102 output from the position circuit 107, to the comparison circuit 108 to which has been assigned the inspection stripe 20 whose stripe region image has been acquired. Since the scanning step is performed for each inspection stripe 20, every time when scanning is carried out for one inspection stripe 20, a stripe region image of the inspection stripe 20 concerned is sent to the comparison circuit 108 to which the inspection stripe 20 concerned has ben assigned. Similarly, data of a generated reference image of each frame region 30 is sequentially sent to the comparison circuit 108 to which the inspection stripe 20 where the frame region concerned is located has been assigned. For example, every time a reference image for one inspection stripe 20 is generated, data of the reference image of the inspection stripe 20 concerned is sent to the comparison circuit 108 to which the inspection stripe 20 concerned has been assigned.

In the plurality of comparing steps (S110), a plurality of comparison circuits 108 individually perform comparison processing of comparing an optical image (images) and a reference image (images) corresponding to the optical image (images), for assigned corresponding one or more inspection stripes 20 in a plurality of inspection stripes 20 (regions).

Figure 7:
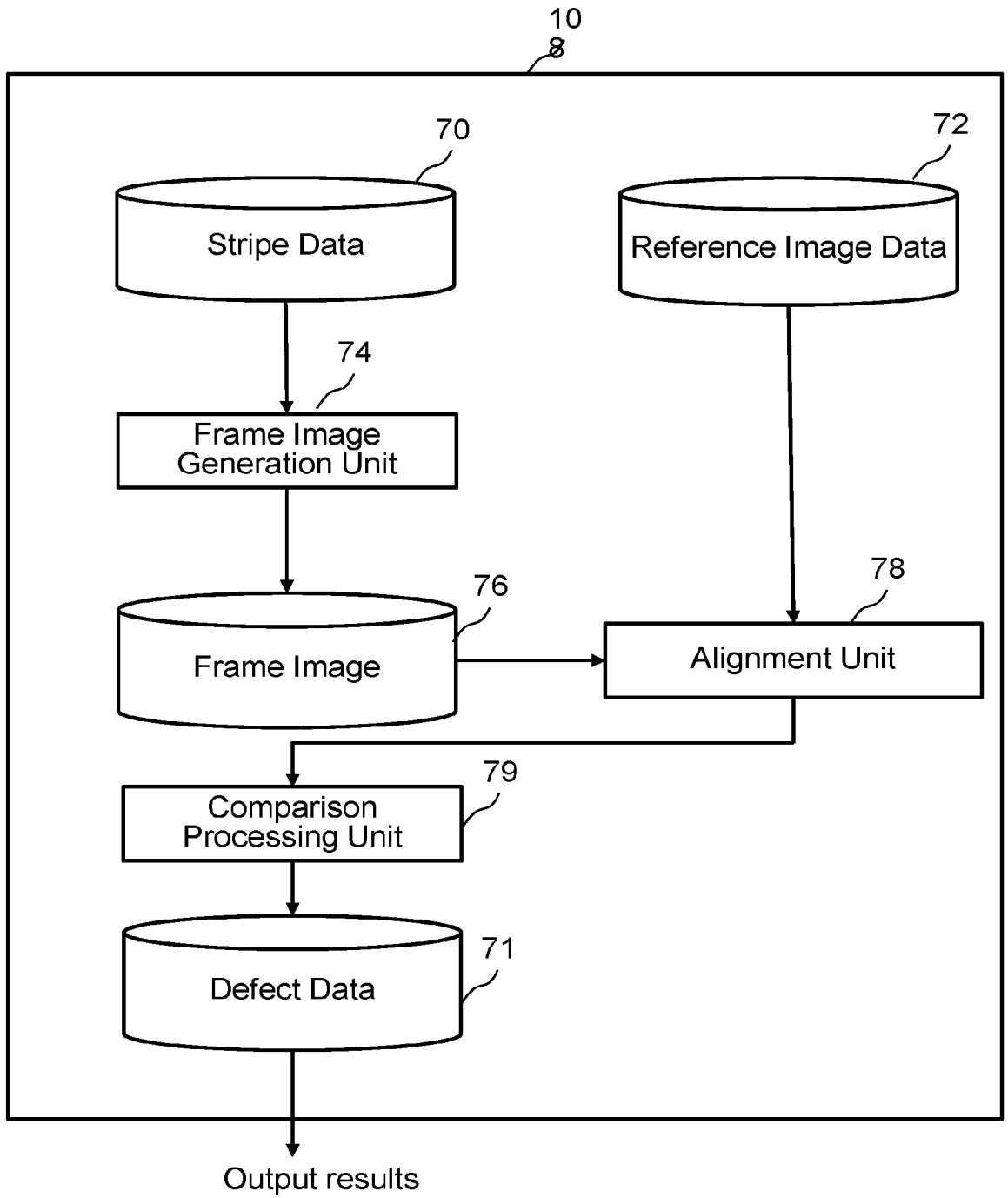
FIG. 7 shows an example of the internal configuration of each comparison circuit according to the first embodiment.

FIG. 7 shows an example of the internal configuration of each comparison circuit according to the first embodiment. As shown in FIG. 7, in each comparison circuit 108, there are disposed storage devices 70, 71, 72, and 76 such as magnetic disk drives, a frame image generation unit 74, an alignment unit 78, and a comparison processing unit 79. Each of the "units" such as the frame image generation unit 74, the alignment unit 78, and the comparison processing unit 79 includes processing circuitry. As the processing circuitry, for example, an electric circuit, computer, processor, circuit board, quantum circuit, semiconductor device, or the like can be used. Each of the "units" may use common processing circuitry (the same processing circuitry), or different processing circuitry (separate processing circuitry). Input data needed in the frame image generation unit 74, the alignment unit 78, and the comparison processing unit 79, and calculated results are stored in a memory (not shown) in the comparison circuit 108 or in the memory 111 each time.

Stripe data (stripe region image) input to each comparison circuit 108 is stored in the storage device 70 in the comparison circuit 108 concerned. Reference image data input to each comparison circuit 108 is stored in the storage device 72 in the comparison circuit 108 concerned.

In each comparison circuit 108, first, the frame image generation unit 74 generates a plurality of frame images 31 by dividing the stripe region image (optical image) by a predetermined width. Specifically, as shown in FIG. 2, the stripe region image is divided into frame images of a plurality of rectangular frame regions 30. For example, it is divided into the size of 512×512 pixels. Data of each frame region 30 is stored in the storage device 76.

Next, the alignment unit 78 reads, for each frame region 30, a corresponding frame image 31 and a corresponding reference image from the storage devices 72 and 76, and performs alignment (position adjustment) of the frame image 31 and the corresponding reference image based on a predetermined algorithm. For example, the alignment is performed according to the least-square method.

The comparison processing unit 79 (comparison unit) compares the frame image 31 with the reference image corresponding to the frame image 31 concerned. For example, comparing is performed for each pixel. Here, the comparison processing unit 79 compares, for each pixel, both the images based on predetermined determination conditions in order to determine whether there is a defect such as a shape defect, or not. As the determination conditions, for example, there is used a predetermined algorithm, based on which both the images are compared with each other, for each pixel, in order to determine whether a defect exists or not. For example, for each pixel, a difference between the pixel value of the optical image and the pixel value of the reference image is calculated, and it is determined there is a defect when the difference value is larger than a threshold Th. Then, the comparison result is output to the storage device 71. Moreover, the comparison result may be output, for example, to the magnetic disk drive 109, the magnetic tape drive 115, the flexible disk drive (FD) 116, the CRT 117, the pattern monitor 118, or alternatively, output from the printer 119.

Although the case of performing the die-to-database inspection is described in the above example, the die-to-die inspection may also be used. In that case, with respect to frame regions of dies 1 and 2 for the die-to-die inspection, the comparison circuit 108 uses a frame image (optical image) of the die 2, as a reference (reference image). First, for each frame region 30 to which the die-to-die inspection is performed, the alignment unit 78 reads the frame image 31 of the die 1 and a corresponding frame image of the die 2 from the storage device 76, and performs alignment between the frame images of the dies 1 and 2 based on a predetermined algorithm. For example, the alignment is performed according to the least-square method. Then, for each frame region 30 to which the die-to-die inspection is performed, the comparison processing unit 79 (comparison unit) compares, for each pixel, the frame image 31 of the die 1 with the corresponding frame image of the die 2.

Each of a plurality of comparison circuits 108 individually starts comparison processing when inputting of the stripe image and the reference image of an assigned inspection stripe 20 has been completed. Therefore, comparison processing may be performed in parallel by two or more comparison circuits in a plurality of comparison circuits 108.

In the inspection abnormality determining step (S120), based on comparison results generated in a plurality of comparison circuits 108, the inspection abnormality determination circuit 132 (inspection abnormality determination unit) determines whether, in a plurality of inspection stripes 20, there is the inspection stripe 20 in which an abnormality exists in comparison or not.

Figure 8:
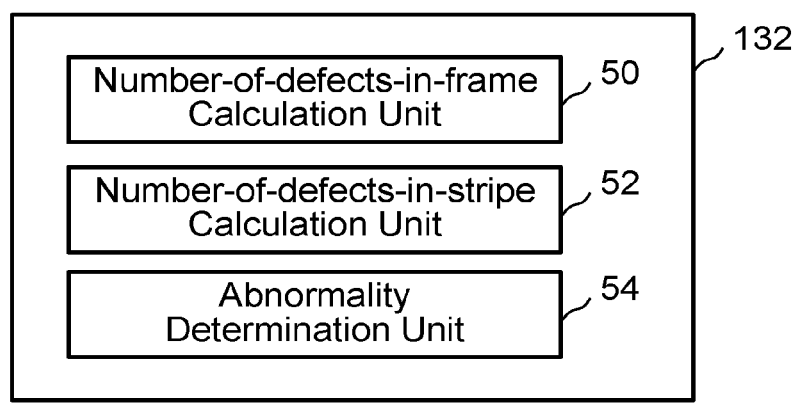
FIG. 8 shows an example of the internal configuration of an inspection abnormality determination circuit according to the first embodiment.

FIG. 8 shows an example of the internal configuration of an inspection abnormality determination circuit according to the first embodiment. As shown in FIG. 8, a number-of-defects-in-frame calculation unit 50, a number-of-defects-in-stripe calculation unit 52, and an inspection abnormality determination unit 54 are arranged in the inspection abnormality determination circuit 132. Each of the "units" such as the number-of-defects-in-frame calculation unit 50, the number-of-defects-in-stripe calculation unit 52, and the inspection abnormality determination unit 54 includes processing circuitry. As the processing circuitry, for example, an electric circuit, computer, processor, circuit board, quantum circuit, semiconductor device, or the like can be used. Each of the "units" may use common processing circuitry (the same processing circuitry), or different processing circuitry (separate processing circuitry). Input data needed in the number-of-defects-in-frame calculation unit 50, the number-of-defects-in-stripe calculation unit 52, and the inspection abnormality determination unit 54, and calculated results are stored in a memory (not shown) in the inspection abnormality determination circuit 132 or in the memory 111 each time.

For each inspection stripe 20, the number-of-defects-in-frame calculation unit 50 calculates, for each frame region 30, the number of defects in each frame with reference to a result of comparison processing. Moreover, the number-of-defects-in-stripe calculation unit 52 calculates, for each inspection stripe 20, the number of defects in each inspection stripe by totaling the number of defects in respective frames.

The inspection abnormality determination unit 54 determines, for each inspection stripe 20, whether the number of defects is greater than or equal to a threshold Tth1. Moreover, for each inspection stripe 20, the inspection abnormality determination unit 54 determines, for each frame region 30, whether the number of defects is greater than or equal to a threshold Tth2. Thereby, the inspection stripe 20 in which the number of defects is greater than or equal to the threshold Tth1 is detected as an inspection stripe 20 with an inspection abnormality. Similarly, in the case where defects whose number is greater than or equal to the threshold Tth2 exist in a biased state in a certain area in the inspection stripe 20, the frame region 30 corresponding to the certain area is detected as a frame region 30 with an inspection abnormality.

When the inspection stripe 20 with an inspection abnormality or the frame region 30 with an inspection abnormality is detected, the control computer 110 promptly interrupts (discontinues) the comparison processing performed by all the comparison circuits 108. Alternatively, when comparison processing being currently performed in the inspection stripe 20 is completed, the control computer waits or "stands by" without performing comparison processing of the next inspection stripe 20.

In the malfunction diagnosing step (S122), the malfunction diagnosis circuit 134 diagnoses whether the comparison circuit 108 that has performed comparison processing for the inspection stripe 20 determined to have an inspection abnormality has a malfunction or not.

FIGS. 9A and 9B illustrate a method for diagnosing a malfunction according to the first embodiment. FIG. 9A shows the case where an abnormality occurred in comparison in the inspection stripe 1 for which the comparison circuit 1 performed comparison processing. According to the first embodiment, defining the comparison circuit 108 (here, as an example, the comparison circuit 1) that performed comparison processing for the inspection stripe 20 (here, as an example, the inspection stripe 1) determined to have an inspection abnormality, as a candidate for malfunction, the malfunction diagnosis circuit 134 makes two or more comparison circuits 108, including the candidate for malfunction, perform comparison processing in parallel for the inspection stripe 20 determined to have the inspection abnormality. In FIG. 9B, for example, all of the comparison circuits 1 to 10, are let to perform comparison processing for the same inspection stripe 1. However, it is not limited thereto. As mentioned above, it will be accepted if two or more comparison circuits 108 including a comparison circuit being the candidate for malfunction are let to perform comparison processing for the same inspection stripe 1. As data of a stripe image, the one that has already been acquired may be used. Similarly, as data of a reference image, the one that has already been generated may be used. However, it is not limited thereto. Although it takes time, scanning may be performed again to acquire data, and alternatively, a reference image may be generated again.

Then, based on comparison results generated in parallel in two or more comparison circuits, it is diagnosed whether the comparison circuit (here, as an example, the comparison circuit 1) being the candidate for malfunction has a malfunction or not. Specifically, if an inspection abnormality is detected in comparison processing performed by the comparison circuit (here, as an example, the comparison circuit 1) being the candidate for malfunction, and no inspection abnormality is detected in comparison processing performed by another comparison circuit 108, the malfunction diagnosis circuit 134 diagnoses that the comparison circuit (here, as an example, the comparison circuit 1) being the candidate for malfunction has a malfunction. Moreover, even when an inspection abnormality is not determined in comparison processing performed by the comparison circuit (here, as an example, the comparison circuit 1) being the candidate for malfunction, if its number of defects in the comparison processing is larger than that of another comparison circuit 108, it is acceptable to diagnose that the comparison circuit (here, as an example, the comparison circuit 1) being the candidate for malfunction has a malfunction. If an inspection abnormality in comparison processing is also detected in another comparison circuit 108, the malfunction diagnosis circuit 134 determines that there is no device malfunction (failure) but that the substrate 101 itself has a defect. Information on the comparison circuit 108 determined as a malfunction is output to the assignment processing circuit 136, and the information (e.g., identification information) input to the assignment processing circuit 136 is stored in the storage device 57. Then, the control computer 110 controls to resume the comparison processing.

In the comparison circuit excluding step (S140), the assignment processing unit 56 excludes the comparison circuit 108 (for example, the comparison circuit 1) diagnosed as a malfunction from the assignment target to which an inspection stripe is assigned. Then, the assignment processing unit 56 individually assigns the inspection stripes 20 where comparison processing is to be performed to the comparison circuits 108 (for example, the comparison circuits 2 to 10) that are not diagnosed as malfunctions in a plurality of comparison circuits 108.

FIG. 10 shows an example of assignment processing after diagnosis for malfunction according to the first embodiment. FIG. 10 shows the case where the comparison circuit 1, for example, is diagnosed as a malfunction. If comparison processing is interrupted promptly when an abnormality is determined in the comparison processing, the comparison processing has not been completed with respect to not only the inspection stripe 1 but also the inspection stripes 2 to 10. Therefore, referring to identification information on the malfunction comparison circuit stored in the storage device 57, the assignment processing unit 56 reassigns the inspection stripes 1 to 9 to the comparison circuits 2 to 10.

If, when an inspection abnormality is determined in comparison processing, the control computer waits without performing comparison processing of the next inspection stripe 20 after completing the comparison processing for the inspection stripes being currently performed, the comparison processing for the inspection stripes 2 to 10 has been finished. In that case, since it is not necessary to perform the comparison processing overlappingly, the assignment processing unit 56 reassigns the inspection stripe 1 to the comparison circuit 2, and assigns the inspection stripes 11 to 18 which are before comparison processing to the comparison circuits 3 to 10.

The comparison circuits 2 to 10 individually perform comparison processing for each subsequent assigned inspection stripe 20.

As described above, by detecting a malfunction comparison circuit 108 and excluding it from the assignment target to which an inspection stripe is assigned, the comparison processing can be continued using the remaining comparison circuits 108.

As described above, according to the first embodiment, when defects occur frequently, even if the inspection apparatus 100 has a malfunction, it is possible to avoid a long downtime. Therefore, for example, taking urgent countermeasures in a holiday or at night can be reduced.

Second Embodiment

Although in the first embodiment two or more comparison circuits including a comparison circuit being a candidate for malfunction perform comparison processing for the inspection stripe 20 determined to have an inspection abnormality, embodiments are not limited thereto. A second embodiment describes a configuration where regions for comparison processing are shifted in order to redo the comparison processing. The configuration of the inspection apparatus 100 is the same as that of FIG. 1. The flowchart of an inspection method is the same as that of FIG. 3. In the second embodiment, the contents of each step except for the malfunction diagnosing step (S122) are the same as those of the first embodiment.

FIGS. 11A and 11B illustrate a method for diagnosing a malfunction according to the second embodiment. Similarly to FIG. 9A, FIG. 11A shows the case where an abnormality occurred in the inspection stripe 1 for which the comparison circuit 1 performed comparison processing.

According to the second embodiment, in the malfunction diagnosing step (S122), defining the comparison circuit 108 (here, as an example, the comparison circuit 1) that performed comparison processing for the inspection stripe (here, as an example, the inspection stripe 1) determined to have an inspection abnormality, as a candidate for malfunction, the malfunction diagnosis circuit 134 shifts assignment destination, and reassigns each of the plurality of inspection stripes 20 including the inspection stripe 20 (here, as an example, the inspection stripe 1) determined to have the inspection abnormality in order not to reassign the inspection stripe 20 determined to have the inspection abnormality to the comparison circuit 108 being the candidate for malfunction. Then, a plurality of comparison circuits 108 perform, in parallel, comparison processing for the inspection stripes 20 having been shifted and assigned. In FIG. 11B, for example, the comparison circuits 1 to 9 perform comparison processing for the inspection stripes 2 to 10, and the comparison circuit 10 performs comparison processing for the inspection stripe 1 determined to have an inspection abnormality. As data of a stripe image of each inspection stripe 20, the one that has already been acquired may be used. Similarly, as data of a reference image, the one that has already been generated may be used.

Based on comparison results generated in a plurality of comparison circuits 108 to which the inspection stripes 20 have been reassigned, it is diagnosed whether the comparison circuit (here, as an example, the comparison circuit 1) being the candidate for malfunction has a malfunction or not. For example, if an inspection abnormality is not detected in comparison processing re-performed in the inspection stripe 1 determined to have an inspection abnormality for which the comparison circuit 10 performed the comparison processing, and an inspection abnormality is detected in comparison processing performed in the inspection stripe 2 for which the comparison circuit 1 being the candidate for malfunction performed the comparison processing, it is diagnosed that the comparison circuit (here, as an example, the comparison circuit 1) being the candidate for malfunction has a malfunction. If an inspection abnormality is not detected in comparison processing performed in the inspection stripe 2 for which the comparison circuit 1 being the candidate for malfunction performed the comparison processing, and an inspection abnormality is detected in comparison processing for the inspection stripe 1 for which the comparison circuit 10 performed the comparison processing, it is determined that there is no device malfunction (failure) but that the substrate 101 itself has a defect. Information on the comparison circuit 108 determined as a malfunction is output to the assignment processing circuit 136.

As described above, by detecting the malfunction comparison circuit 108 and excluding it from the assignment target to which an inspection stripe is assigned similarly to the first embodiment, the comparison processing can be continued using the remaining comparison circuits 108.

Third Embodiment

Although, in the first and second embodiments, diagnosis for malfunction existence is executed after examining whether the comparison circuit, being a candidate for malfunction, really has a malfunction or not, embodiments are not limited thereto. A third embodiment describes a configuration where examining if it is really a malfunction is omitted. The configuration of the inspection apparatus 100 is the same as that of FIG. 1. The flowchart of an inspection method is the same as that of FIG. 3. In the third embodiment, the contents of each step except for the malfunction diagnosing step (S122) are the same as those of the first embodiment.

According to the third embodiment, in the malfunction diagnosing step (S122), the malfunction diagnosis circuit 134 promptly diagnoses that the comparison circuit that performed comparison processing for the inspection stripe 20 determined to be abnormal in comparison has a malfunction. Information on the comparison circuit 108 determined as a malfunction is output to the assignment processing circuit 136.

As described above, by diagnosing the comparison circuit 108 that has a suspected malfunction (failure) to be a malfunction comparison circuit, and excluding it from the assignment target to which the inspection stripe 20 is assigned similarly to the first and second embodiments, the comparison processing can be continued using the remaining comparison circuits 108. Thus, in the third embodiment, since it is not examined whether a comparison circuit really has a malfunction or not, the time period to resume the comparison processing can be reduced.

Although, in each of Embodiments described above, whether there is a malfunction or not is diagnosed for each comparison circuit 108, embodiments are not limited thereto.

Figure 12:
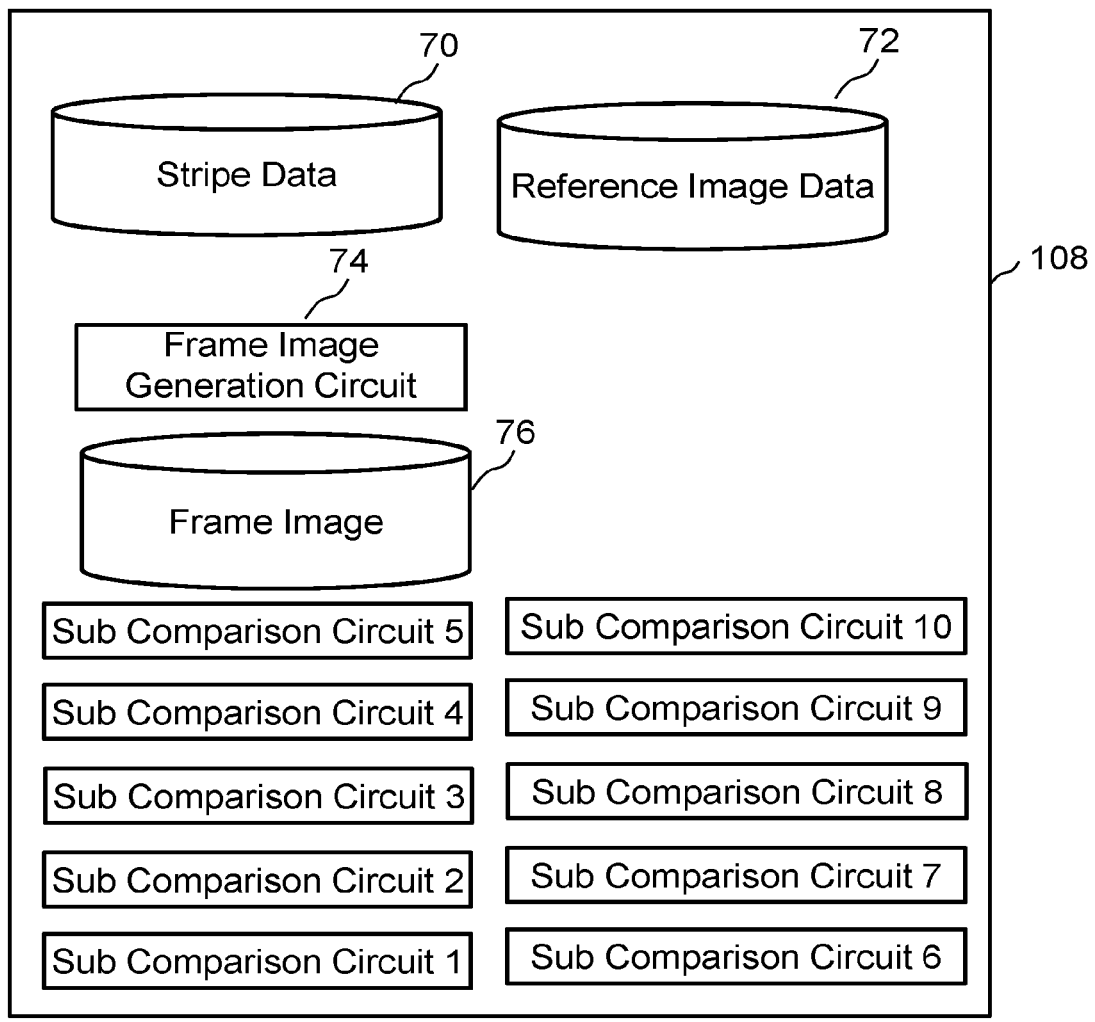
FIG. 12 shows an example of the internal configuration of each comparison circuit according to a modified example of each Embodiment.

FIG. 12 shows an example of the internal configuration of each comparison circuit according to a modified example of each Embodiment. As shown in FIG. 12, in each of a plurality of comparison circuits 108, there are disposed the storage devices 70, 72, and 76 such as magnetic disk drives, the frame image generation unit 74, and a plurality of sub comparison circuits 1 to 10. In each of the sub comparison circuits 1 to 10, there are disposed the storage device 71, the alignment unit 78, and the comparison processing unit 79 shown in FIG. 7.

Comparison processing for each frame region 30 in the inspection stripe 20 assigned to the comparison circuit 108 is in parallel performed decentrally individually by each of the sub comparison circuits 1 to 10. Thereby, the comparison processing time can be reduced.

FIGS. 13A and 13B illustrate a method for diagnosing a malfunction according to a modified example of each Embodiment. FIG. 13A shows the case where comparison processing for the k-th inspection stripe 20 is performed by comparison circuit k. Frame regions 1 to 10 in the k-th inspection stripe 20 are individually assigned to a corresponding one of a plurality of sub comparison circuits 1 to 10 in the comparison circuit k. Then, each of the sub comparison circuits 1 to 10 performs comparison processing for the assigned frame region 30.

In the case of FIG. 13A, an abnormality occurs in comparison processing for the frame region 1 performed by the sub comparison circuit 1. The abnormality in the comparison processing may be determined by the inspection abnormality determination unit 54, based on the number of defects calculated by the number-of-defects-in-frame calculation unit 50.

The method for diagnosing a malfunction can be executed by replacing a comparison circuit described in any of the first to third embodiments with a sub comparison circuit. For example, the case associated with using the first embodiment will be described below. Defining the sub comparison circuit 1 that performed comparison processing for the frame region 30 (here, as an example, the frame 1) determined to have an inspection abnormality, as a candidate for malfunction, the malfunction diagnosis circuit 134 makes two or more sub comparison circuits 1 to 10, including the candidate for malfunction, perform comparison processing in parallel for the frame region 30 determined to have the inspection abnormality. In the case of FIG. 13B, for example, all of the sub comparison circuits, 1 to 10, are let to perform comparison processing for the same frame 1.

Then, based on comparison results generated in parallel in two or more sub comparison circuits, it is diagnosed whether the sub comparison circuit (here, as an example, the sub comparison circuit 1) being the candidate for malfunction has a malfunction or not. Specifically, if an inspection abnormality is detected in comparison processing performed by the sub comparison circuit (here, as an example, the sub comparison circuit 1) being the candidate for malfunction, and no inspection abnormality is detected in comparison processing performed by another sub comparison circuit, the malfunction diagnosis circuit 134 diagnoses that the sub comparison circuit (here, as an example, the sub comparison circuit 1) being the candidate for malfunction has a malfunction. Moreover, even when an inspection abnormality is not determined in comparison processing performed by the sub comparison circuit (here, as an example, the sub comparison circuit 1) being the candidate for malfunction, if its number of defects in the comparison processing is larger than that of another sub comparison circuit, it is acceptable to diagnose that the sub comparison circuit (here, as an example, the sub comparison circuit 1) being the candidate for malfunction has a malfunction. If an inspection abnormality is also detected in comparison processing performed by another sub comparison circuit, the malfunction diagnosis circuit 134 determines that there is no device malfunction (failure) but that the substrate 101 itself has a defect. Information on the sub comparison circuit determined as a malfunction is output to the assignment processing circuit 136, and the information (e.g., identification information) input to the assignment processing circuit 136 is stored in the storage device 57. Then, the control computer 110 controls to resume the comparison processing.

In the comparison circuit excluding step (S140), the assignment processing unit 56 excludes the sub comparison circuit 108 (for example, the sub comparison circuit 1) diagnosed as a malfunction from the assignment target to which the frame region 30 is assigned. Then, the assignment processing unit 56 individually assigns the frame regions 30 where comparison processing is to be performed to the sub comparison circuits (for example, the sub comparison circuits 2 to 10) that are not diagnosed as malfunctions in a plurality of sub comparison circuits 1 to 10.

FIG. 14 shows an example of assignment processing after diagnosis for malfunction according to a modified example of each Embodiment. FIG. 14 shows the case where the sub comparison circuit 1, for example, is diagnosed as a malfunction. If comparison processing is interrupted promptly when an abnormality is determined in the comparison processing, the comparison processing has not been completed with respect to not only the frame 1 but also the frame regions 2 to 10. Therefore, referring to identification information on the malfunction comparison circuit stored in the storage device 57, the assignment processing unit 56 reassigns the frames 1 to 9 to the sub comparison circuits 2 to 10.

The sub comparison circuits 2 to 10 individually perform comparison processing for each subsequent assigned frame region 30.

As described above, by detecting a malfunction sub comparison circuit and excluding it from the assignment target to which the frame region 30 is assigned, the comparison processing can be continued using the remaining sub comparison circuits.

Embodiments have been explained referring to specific examples described above. However, the present invention is not limited to these specific examples. For example, in Embodiments, although a transmitted illumination optical system using a transmitted light is described as the illumination optical system 170, it is not limited thereto. For example, a reflected illumination optical system using a reflected light may also be used. Alternatively, a transmitted light and a reflected light may be used simultaneously by way of combining a transmitted illumination optical system and a reflection illumination optical system.

While the apparatus configuration, control method, and the like not directly necessary for explaining the present invention are not described, some or all of them can be appropriately selected and used on a case-by-case basis when needed. For example, although description of the configuration of the control unit for controlling the inspection apparatus 100 is omitted, it should be understood that some or all of the configuration of the control unit can be selected and used appropriately when necessary.

In addition, any other pattern inspection apparatus and pattern inspection method that include elements of the present invention and that can be appropriately modified by those skilled in the art are included within the scope of the present invention.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pattern inspection apparatus comprising:
an optical image acquisition mechanism configured to acquire an optical image of each of a plurality of regions on a substrate to be inspected on which a pattern is formed;
a plurality of comparison circuits configured to individually perform comparison processing of comparing the optical image with a reference image corresponding to the optical image;
an abnormality determination circuit configured to determine, based on comparison results generated in the plurality of comparison circuits, whether there is a region having an inspection abnormality in the plurality of regions;
a malfunction diagnosis circuit configured to diagnose whether a comparison circuit that performed comparison processing for the region determined to have the inspection abnormality in the plurality of regions has a malfunction; and
an assignment processing circuit configured to individually assign regions of the plurality of regions where comparison processing is to be performed to comparison circuits that are not diagnosed as malfunctions in the plurality of comparison circuits, and to exclude a comparison circuit diagnosed as a malfunction from a target to which a region is assigned.

2. The apparatus according to claim 1, wherein defining the comparison circuit that has performed the comparison processing for the region determined to have the inspection abnormality, as a candidate for malfunction, the malfunction diagnosis circuit makes at least two comparison circuits, including the candidate for malfunction, perform comparison processing in parallel for the region determined to have the inspection abnormality, and diagnoses, based on comparison results generated in the at least two comparison circuits, whether the comparison circuit being the candidate for malfunction has a malfunction.

3. The apparatus according to claim 2, wherein, in a case where an inspection abnormality is detected in comparison processing performed by the comparison circuit being the candidate for malfunction, and no inspection abnormality is detected in comparison processing performed by another comparison circuit, the malfunction diagnosis circuit diagnoses that the comparison circuit being the candidate for malfunction has a malfunction.

4. The apparatus according to claim 2, wherein, in a case where an inspection abnormality is not determined in comparison processing performed by the comparison circuit being the candidate for malfunction, but number of defects in the comparison processing performed by the comparison circuit being the candidate for malfunction is larger than that in comparison processing performed by another comparison circuit, the malfunction diagnosis circuit diagnoses that the comparison circuit being the candidate for malfunction has a malfunction.

5. The apparatus according to claim 1, wherein defining the comparison circuit that has performed the comparison processing for the region determined to have the inspection abnormality, as a candidate for malfunction, the malfunction diagnosis circuit shifts assignment destination, and individually reassigns the regions, including the region determined to have the inspection abnormality, to the plurality of comparison circuits in order not to reassign the region determined to have the inspection abnormality to the comparison circuit being the candidate for malfunction, and diagnoses, based on the comparison results generated in the plurality of comparison circuits to which the regions have been reassigned, whether the comparison circuit being the candidate for malfunction has a malfunction.

6. The apparatus according to claim 5, wherein, in a case where an inspection abnormality is not detected in the comparison processing re-performed in the region determined to have the inspection abnormality, and an inspection abnormality is detected in comparison processing performed in a region at a shifted assignment destination for which the comparison circuit being the candidate for malfunction performed the comparison processing, the malfunction diagnosis circuit diagnoses that the comparison circuit being the candidate for malfunction has a malfunction.

7. The apparatus according to claim 1, wherein the malfunction diagnosis circuit diagnoses that the comparison circuit that performed the comparison processing for the region determined to have the inspection abnormality has a malfunction.

8. A pattern inspection method comprising:
acquiring an optical image of each of a plurality of regions on a substrate to be inspected on which a pattern is formed;
performing comparison processing of comparing the optical image with a reference image corresponding to the optical image using each of a plurality of comparison circuits, and outputting each of comparison results;
determining, based on the comparison results generated in the plurality of comparison circuits, whether there is a region having an inspection abnormality in the plurality of regions;
diagnosing whether a comparison circuit that performed comparison processing for the region determined to have the inspection abnormality in the plurality of regions has a malfunction; and
excluding a comparison circuit diagnosed as a malfunction in the plurality of comparison circuits from a target to which a region is assigned, and assigning regions where comparison processing has not yet been performed in the plurality of regions to comparison circuits that are not diagnosed as malfunctions.

9. A pattern inspection apparatus comprising:
an optical image acquisition mechanism configured to acquire an optical image of each of a plurality of regions on a substrate to be inspected on which a pattern is formed;
a plurality of comparison circuits each of which configured to include a plurality of sub comparison circuits that individually perform comparison processing of comparing the optical image with a reference image corresponding to the optical image;
an abnormality determination circuit configured to determine, based on comparison results generated in the plurality of sub comparison circuits, whether there is a region having an inspection abnormality in the plurality of regions;
a malfunction diagnosis circuit configured to diagnose whether a sub comparison circuit that performed comparison processing for the region determined to have the inspection abnormality in the plurality of regions has a malfunction; and
an assignment processing circuit configured to individually assign regions of the plurality of regions, where comparison processing is to be performed, to sub comparison circuits that are not diagnosed as malfunctions in the plurality of sub comparison circuits including a sub comparison circuit diagnosed as a malfunction, and to exclude the sub comparison circuit diagnosed as the malfunction from a target to which a region is assigned.

10. The apparatus according to claim 9, wherein defining the sub comparison circuit that has performed the comparison processing for the region determined to have the inspection abnormality, as a candidate for malfunction, the malfunction diagnosis circuit makes at least two sub comparison circuits, including the candidate for malfunction, perform comparison processing in parallel for the region determined to have the inspection abnormality, and diagnoses, based on comparison results generated in the at least two sub comparison circuits, whether the sub comparison circuit being the candidate for malfunction has a malfunction.

11. The apparatus according to claim 9, wherein defining the sub comparison circuit that has performed the comparison processing for the region determined to have the inspection abnormality, as a candidate for malfunction, the malfunction diagnosis circuit shifts assignment destination, and individually reassigns the plurality of regions, including the region determined to have the inspection abnormality, to the plurality of sub comparison circuits in order not to reassign the region determined to have the inspection abnormality to the sub comparison circuit being the candidate for malfunction, and diagnoses, based on the comparison results generated in the plurality of sub comparison circuits to which the regions have been reassigned, whether the sub comparison circuit being the candidate for malfunction has a malfunction.

* * * * *